United States Patent
Mannherz et al.

(10) Patent No.: US 10,486,660 B2
(45) Date of Patent: Nov. 26, 2019

(54) METHOD AND APPARATUS FOR OPERATING AN ELECTROMOTIVE PARKING BRAKE OF A MOTOR VEHICLE, AND MOTOR VEHICLE

(71) Applicant: Robert Bosch GmbH, Stuttgart (DE)

(72) Inventors: Edith Mannherz, Weinsberg (DE); Helmut Wolff, Untergruppenbach (DE)

(73) Assignee: Robert Bosch GmbH, Stuttgart (DE)

(*) Notice: Subject to any disclaimer, the term of this patent is extended or adjusted under 35 U.S.C. 154(b) by 70 days.

(21) Appl. No.: 15/823,653

(22) Filed: Nov. 28, 2017

(65) Prior Publication Data

US 2018/0148021 A1 May 31, 2018

(30) Foreign Application Priority Data

Nov. 29, 2016 (DE) .................. 10 2016 223 655

(51) Int. Cl.
| | |
|---|---|
| *B60T 7/12* | (2006.01) |
| *B60T 8/24* | (2006.01) |
| *B60T 8/58* | (2006.01) |
| *B60T 8/00* | (2006.01) |
| *B60T 8/17* | (2006.01) |
| *B60T 13/66* | (2006.01) |
| *B60T 13/74* | (2006.01) |

(52) U.S. Cl.
CPC .................. *B60T 7/12* (2013.01); *B60T 8/00* (2013.01); *B60T 8/17* (2013.01); *B60T 8/245* (2013.01); *B60T 8/58* (2013.01); *B60T 13/662* (2013.01); *B60T 13/74* (2013.01); *B60T 2201/06* (2013.01)

(58) Field of Classification Search
None
See application file for complete search history.

(56) References Cited

U.S. PATENT DOCUMENTS

| | | | | |
|---|---|---|---|---|
| 2004/0090112 | A1* | 5/2004 | Tachiiri | B60T 7/107 303/20 |
| 2006/0049691 | A1* | 3/2006 | Deprez | B60T 7/00 303/191 |
| 2007/0170775 | A1* | 7/2007 | Uchimura | B60T 7/107 303/112 |
| 2008/0262687 | A1* | 10/2008 | Fujita | B60T 7/12 701/70 |
| 2011/0004386 | A1* | 1/2011 | Kinder | B60T 7/042 701/70 |
| 2014/0067221 | A1* | 3/2014 | Sundaram | B60T 7/042 701/70 |

(Continued)

*Primary Examiner* — Timothy Hannon
(74) *Attorney, Agent, or Firm* — Maginot, Moore & Beck LLP

(57) ABSTRACT

The disclosure relates to a method for operating at least one parking brake of a motor vehicle, which parking brake can be activated and deactivated in an automated manner, wherein, for the purpose of automated operation of the parking brake, state values of the motor vehicle are monitored and compared with prespecifiable conditions, and wherein the parking brake is activated when a first group of the conditions is met and is deactivated when a second group of the conditions is met. It is provided that the parking brake is activated only when all of the conditions of the second group can be successfully checked for compliance or non-compliance with the respective condition.

10 Claims, 2 Drawing Sheets

(56) References Cited

U.S. PATENT DOCUMENTS

2014/0188362 A1\* 7/2014 Kotake ................. B60T 13/741
                                                    701/70
2016/0339888 A1\* 11/2016 Yokoyama .............. B60T 7/042
2017/0096129 A1\* 4/2017 Choi ......................... B60T 7/12

\* cited by examiner

METHOD AND APPARATUS FOR OPERATING AN ELECTROMOTIVE PARKING BRAKE OF A MOTOR VEHICLE, AND MOTOR VEHICLE

This application claims priority under 35 U.S.C. § 119 to application no. DE 10 2016 223 655.5, filed on Nov. 29, 2016 in Germany, the disclosure of which is incorporated herein by reference in its entirety.

The disclosure relates to a method for operating at least one parking brake of a motor vehicle, which parking brake can be activated and deactivated in an automated manner, wherein, for the purpose of automated operation of the parking brake, state values of the motor vehicle are monitored and compared with prespecifiable conditions, and wherein the parking brake is activated when a first group of the conditions is met and is deactivated when a second group of the conditions is met.

The disclosure further relates to an apparatus for operating a parking brake of a motor vehicle, comprising a controller which is designed to confirm the parking brake in an automated manner.

The disclosure further relates to a parking brake system of a motor vehicle, comprising a parking brake and comprising the abovementioned apparatus.

BACKGROUND

Methods and apparatuses for parking brake systems of the kind set forth at the outset are already known from the prior art. Automated parking brakes can be operated, for example, electromotively or hydraulically and are designed to set a parking brake force independently of operation of a service brake pedal. Amongst others, solutions in which a parking brake is integrated in a conventional hydraulically operable wheel brake, which acts as a service brake in this respect, are known. To this end, the wheel brake is designed in such a way that a brake piston of the wheel brake can be displaced both hydraulically and also electromotively in order to generate a braking force.

By virtue of operating a parking brake switch, the user or driver of a motor vehicle can control the activation and deactivation of the parking brake without having to apply the force necessary to achieve the parking brake force himself, as in the case of conventional mechanical parking brakes. In order to increase the driving convenience, methods which carry out automated activation and deactivation of the parking brake are also known. To this end, state values of the motor vehicle are first monitored and compared with prespecifiable conditions in order to make a decision about the activation or deactivation of the parking brake. Therefore, it is known, for example, to automatically activate the parking brake when it is identified that the vehicle is stationary and the ignition of the motor vehicle is switched off. In this way, it is possible to securely park the motor vehicle even when, for example, the parking brake switch is defective. Furthermore, it is known to automatically release or deactivate the parking brake, again without operation of the parking brake switch, when particular conditions are met, such as operation of an accelerator pedal beyond a prespecifiable limit value when the ignition is switched on for example.

The state values or the checked conditions which lead to the automated activation or deactivation of the parking brake are not identical however. When the ignition is switched off, this can lead to the parking brake being activated in an automated manner because a first group of conditions required for this purpose is met, but it is then not possible to release said parking brake in an automated manner because one of the conditions of a second group of conditions which is required for this purpose is not met, wherein this condition is not included in the first group of conditions. The user can now usually release or actively actuate the parking brake to be released in an automated manner or to be deactivated by operating the parking brake switch. However, in the event of a malfunction of the parking brake switch, this is no longer necessarily possible.

SUMMARY

The method according to the disclosure having the features disclosed herein has the advantage that it is ensured that the motor vehicle is not undesirably held at a stop by an activated parking brake. According to the disclosure, this is achieved in that the parking brake is activated only when all of the conditions of the second group can be successfully checked for compliance or non-compliance with the respective condition. This means that the parking brake is automatically activated only when the first group of conditions is met and the second group of conditions can be completely checked. This ensures that the parking brake can be released in an automated manner after deactivation, that is to say when all of the conditions of the second group are met. Therefore, the situations of the parking brake not being able to be released in an automated manner and, as a result, the motor vehicle being undesirably held at a stop over the long term on account of a fault are avoided. Therefore, activation is allowed only when the availability of the data required for the automated deactivation (second group of conditions) is available or valid. Therefore, in order to carry out the method, the state values which have to be used for checking the second group of conditions are initially monitored or checked as to whether they are available for checking the second group of conditions or not. If one of the state values is not available, at least one of the conditions of the second group cannot be checked as to whether it is met or not met because the input signal required for this purpose or the input value or state value required for this purpose is not present.

According to a preferred embodiment of the disclosure, it is provided that a vehicle speed, a state of an ignition of the motor vehicle, a roadway inclination, an operating state of an accelerator pedal, a driver presence, a coupling state of a clutch in the drive train and/or a switching state of a parking brake switch are monitored or detected as state values of the motor vehicle. With knowledge of these state values, automated activation and deactivation of the parking brake can be advantageously carried out.

In particular, it is provided that, as a first group of conditions, a check is made as to whether the driving speed is equal to zero and the ignition is switched off. This ensures that, only when the vehicle is stationary, the parking brake is activated when the ignition is switched off and, for example, an ignition key has been withdrawn.

Furthermore, it is preferably provided that, as a second group of conditions, a check is made as to whether the ignition is switched on and an accelerator pedal is operated. Therefore, the second group of conditions is met only when the vehicle is ready to be driven and a drive torque is requested by the driver. In addition, detection as to whether an operative connection between a drive machine and drive side of a motor vehicle is closed in the drive train is preferably effected. This ensures that the parking brake is not released without it being possible for a drive torque to be transmitted to the roadway. This prevents the driver from releasing or deactivating the parking brake by operating the accelerator pedal and the motor vehicle beginning to roll in an uncontrolled manner.

Furthermore, it is preferably provided that the parking brake is deactivated depending on an accelerator pedal position and the detected roadway inclination. As a result, a connection is created between the requested drive torque and the current roadway inclination, said connection ensuring that the vehicle, for example, does not roll back in an uncontrolled manner owing to premature deactivation of the parking brake before a sufficiently high drive torque which prevents rolling back is available.

Furthermore, it is preferably provided that a check is made as to whether all of the conditions of the second group can be checked for compliance or non-compliance only when the functionality of the parking brake switch cannot be established. If the functionality of the parking brake switch cannot be established because said parking brake switch has, for example, a malfunction or there is a fault in the communication to the parking brake switch, the second group of conditions is checked, in particular the state values which are associated with the second group of conditions are checked as to whether they are available for checking for compliance or non-compliance with the conditions of the second group, in order to prevent the motor vehicle being held at a stop in an undesired manner by the activated parking brake. However, if the functionality of the parking brake switch can be ascertained, checking of the second group of conditions can be dispensed with because release of the parking brake is ensured by operation of the parking brake switch.

Furthermore, it is preferably provided that, when one condition of the second group cannot be successfully checked, that is to say at least one state value for checking at least one condition of the second group of conditions is not available or cannot be detected, the parking brake switch is checked for functionality, and that the parking brake is nevertheless activated when the functionality of the parking brake switch could be established and the one condition of the second group could not be checked. In contrast to the above-described embodiment, the second group of conditions is therefore initially checked, wherein, when it is established that one of the conditions cannot be checked because, for example, one of the state values required for this purpose is not available or cannot be detected, the activation of the parking brake is nevertheless permitted when the functionality of the parking brake switch is established.

According to a further embodiment of the disclosure, it is preferably provided that, when one condition of the second group of conditions cannot be successfully checked, that is to say compliance or non-compliance with the condition cannot be established, and when the functionality of the parking brake switch cannot be established, a warning message is output and/or activation of the parking brake is suppressed. As a result, the driver is made aware that the parking brake system is not functioning satisfactorily and the automated parking brake function is not available.

The apparatus according to the disclosure having the features of one embodiment is distinguished in that the controller is specially designed to carry out the method according to the disclosure. This results in the advantages already mentioned.

The parking brake system according to the disclosure having the features of one embodiment is distinguished by the apparatus according to the disclosure. This results in the advantages already mentioned.

BRIEF DESCRIPTION OF THE DRAWINGS

Further advantages and preferred features and combinations of features can be gathered, in particular, from the above description. The disclosure will be explained in more detail below with reference to the drawing, in which.

DETAILED DESCRIPTION

Figure 1:
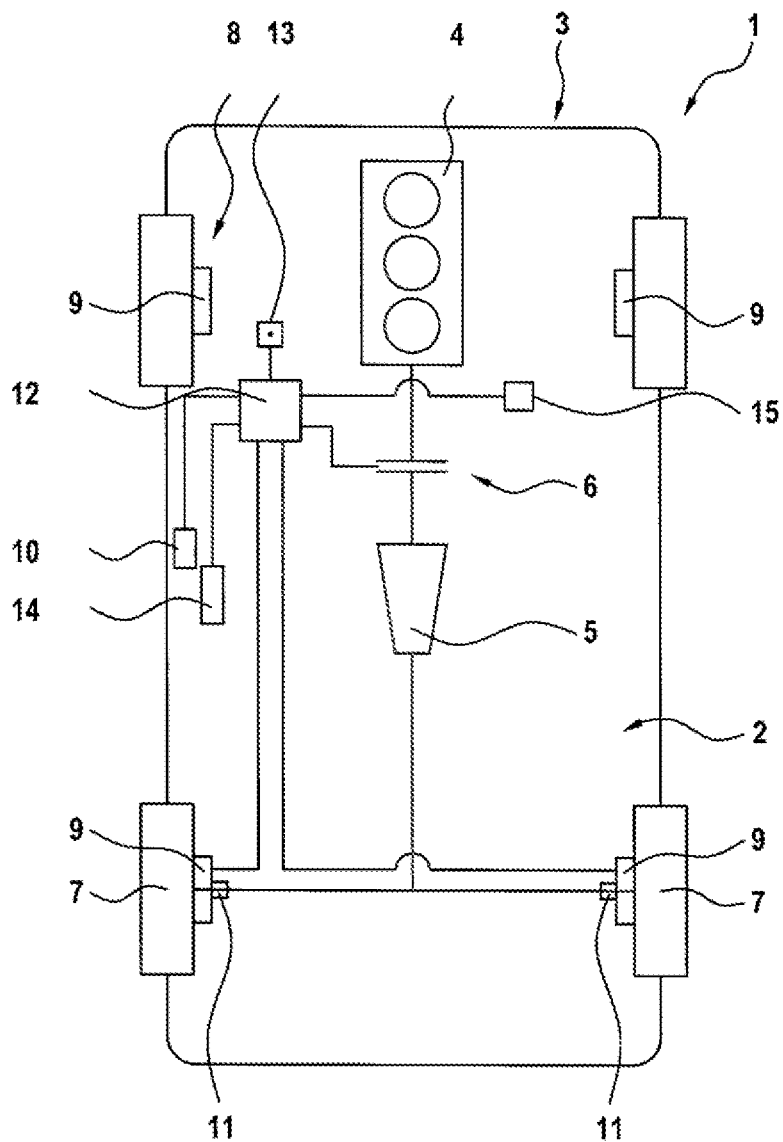
FIG. 1 shows a simplified plan view of a motor vehicle.

FIG. 1 shows a simplified plan view of a motor vehicle 1 which has an advantageous parking brake system 2. The motor vehicle 1 has a drive train 3 which comprises a drive machine 4, in the present case an internal combustion engine, and a manual or automated gearbox 5 which can be operatively connected to one another by an operable clutch 6. The drive train 3 is operatively connected to at least two drive wheels 7 of the motor vehicle 1 in order to generate a drive torque and to transmit said drive torque to a roadway in order to propel the motor vehicle 1.

The motor vehicle 1 further has a service brake system 8 which has a plurality of wheel brakes 9 which are each associated with one of the wheels of the motor vehicle 1. The wheel brakes 9 can be operated as service brakes in a hydraulic manner, in particular by operating a brake pedal 10. The wheel brakes 9 which are associated with the drive wheels 7 further have an integrated parking brake 11 which can be actuated by a controller 12 of the parking brake system 2. The parking brakes 11 each have an electromotive actuator which interacts with a brake piston of the respective wheel brake 9 and can also be operated in a hydraulic manner. The respective actuator has, in addition to an electric motor, a self-locking gear mechanism, so that once a braking force is set by the actuator 11 it is mechanically maintained. This ensures activation of the parking brake by the actuator, wherein the parking brake force can be maintained without further actuation and therefore without further expenditure of energy.

The parking brake system 2 further has a parking brake switch 13 which is arranged in the interior of the motor vehicle 1 in such a way that it can be operated by the user, in particular by the driver of the motor vehicle 1. In the present case, the operating state of the parking brake switch 13 is monitored by the controller 12. If the user operates the parking brake switch 13 for the purpose of activating a parking brake function, the controller 12 in the normal case actuates the parking brake 11 to set a parking brake force on the respective wheel brake 9 by way of which the motor vehicle 1 is reliably held at a standstill. If the driver operates the parking brake switch 13 for the purpose of deactivating the parking brake function, the controller 12 in the normal case actuates the parking brakes 11 to reduce the parking brake force and to release locking of the motor vehicle 1.

In order to increase the operator control convenience for the driver, the controller 12 also detects state values of the motor vehicle in accordance with which the controller 12 activates and deactivates the parking brakes 11 in an automated manner.

To this end, the controller 12 detects a plurality of state values of the motor vehicle 1. These state values are, in particular, a current driving speed, a current roadway inclination, an operating state of an accelerator pedal 14, a coupling state of the clutch 6 and the switching state of the parking brake switch 13. In addition, the driver presence is optionally detected by suitable means. The roadway inclination is monitored, in particular, by one or more sensors 15 which are/is in the form of an acceleration sensor or sensors for example, in particular a longitudinal acceleration sensor or sensors. The controller 12 preferably also monitors the switching state of the gearbox 5 as state value.

The controller 12 checks whether two groups of conditions are met. As a first group of conditions, a check is made as to whether the driving speed of the motor vehicle 1 is equal to zero and the ignition of the motor vehicle 1 is switched off. The driving speed and the ignition state can be detected, for example, via a data bus on which these state values are present in the motor vehicle 1 in any case. As an alternative or in addition, the driving speed is calculated from the rotation speed signal of at least one wheel rotation speed sensor, in particular which is directly connected to the controller 12. If the first group of conditions is met, the controller 12 activates the parking brakes 11 in order to set the parking brake force.

As a second group of conditions, the controller 12 checks whether the ignition is switched on and the accelerator pedal 14 is operated. If the gearbox 5 is a manual gearbox in which the clutch 6 also has to be operated by the user by operating a corresponding clutch pedal, the controller 12 additionally checks whether the clutch 6 is engaged and a gear of the gearbox is selected. If this is the case, the controller 12 actuates the parking brakes 11 to reduce the parking brake force and as a result to release the respective parking brake 11.

Figure 2:
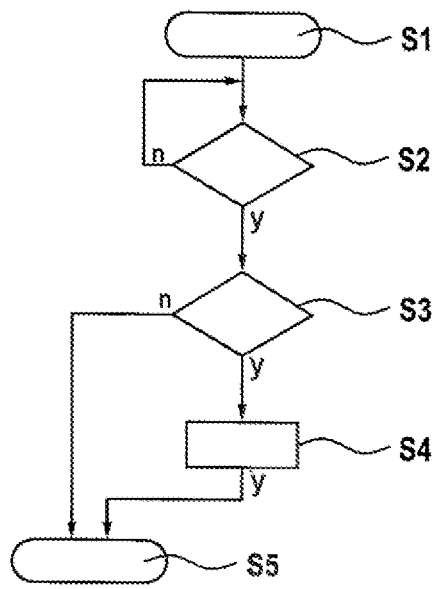
FIG. 2 shows a method for operating a parking brake system of the motor vehicle according to a first exemplary embodiment.

FIG. 2 shows a flowchart of an advantageous method which is executed by the controller 12. After start-up in step S1, the controller 12 checks, in particular continuing into a subsequent step S2, whether the first group of conditions is met. If this is the case (y), the respective parking brake 11 is, however, not immediately actuated to be activated, but rather a check is firstly made in a subsequent step S3 as to whether all of the conditions of the second group can be successfully checked for compliance or non-compliance or whether compliance or non-compliance with the respective condition can be established. To this end, the state values, which are necessary for checking the conditions of the second group of conditions, are monitored as to whether they can be detected by the controller 12 or whether they are available to the controller 12. If this is not the case (n), the method is terminated without the parking brakes 11 being activated. However, if the conditions of the second group can be or are successfully checked (y) because all of the state values required for this purpose are available, the parking brakes 11 are activated in an automatic or automated manner in a subsequent step S4 and the method is terminated only in the subsequent step S5.

This ensures that the respective parking brake 11 is activated in an automated manner only when deactivation of said parking brake in an automated manner is possible too.

Figure 3:
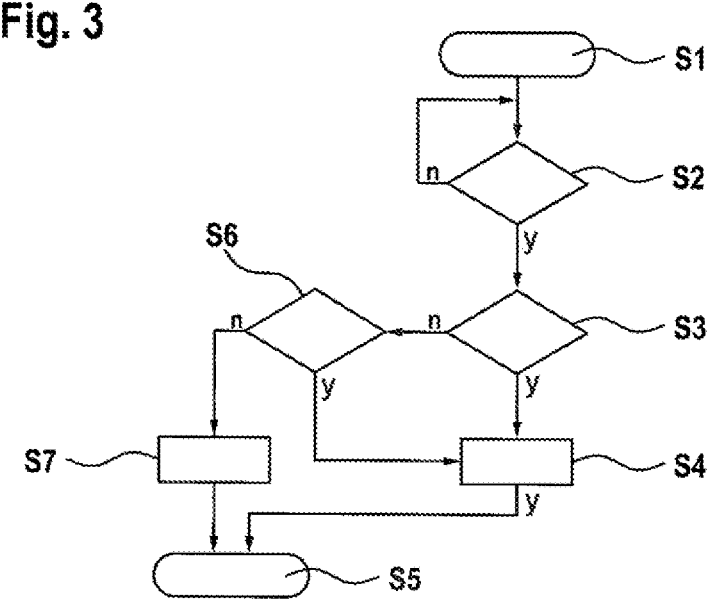
FIG. 3 shows a method for operating the parking brake system according to a second exemplary embodiment.

FIG. 3 shows a second exemplary embodiment of the method, wherein steps which are already known from FIG. 2 are provided with the same reference symbols. Essentially only the differences from the method according to FIG. 2 will be discussed below.

In contrast to the preceding exemplary embodiment, in the method according to FIG. 3, it is provided that, when the second group of conditions cannot be completely checked (n), the availability or functionality of the parking brake switch 13 is then checked in a step S6. In order to check the functionality or availability of the parking brake switch 13, said parking brake switch can be, for example, electrically actuated and an electrical reaction can be awaited. Corresponding checking methods are fundamentally known from the prior art, and therefore do not need to be discussed in detail at this point. If the check in step S6 shows that the parking brake switch 13 is functional (y), the method is continued in step S4 and the respective parking brake 11 is activated. This is possible because, even after the parking brake is activated, the user can actively release said parking brake again by manually operating the parking brake switch S6. This ensures that the driver can release the motor vehicle 1 again even after activation of the parking brake 11 in an automated manner. However, if the parking brake switch 13 is also defective or not available (n), a warning message is output to the driver in a subsequent step S7 and the method is terminated in a step S5 without activation of the parking brakes 11.

If activation of the parking brakes 11 in an automated manner is suppressed or prevented, the driver is expediently informed that he can activate the parking brakes 11 only by operating the parking brake switch 13, provided that said parking brake switch is functional/available. Activation of the parking brakes 11 is prevented overall only when both the second group of conditions cannot be fully checked for compliance or non-compliance with the conditions and the parking brake switch 13 is not available or faulty, since otherwise the driver would then no longer have any way of releasing said parking brakes again.

What is claimed is:

1. A method for automating operation of at least one parking brake of a motor vehicle, the at least one parking brake configured to be activated and deactivated in an automated manner, the method comprising:
    monitoring state values of the motor vehicle;
    comparing the state values with predetermined conditions;
    automatically activating the at least one parking brake in response to a first group of the predetermined conditions being met; and
    automatically deactivating the at least one parking brake in response to a second group of the predetermined conditions being met,
    wherein the at least one parking brake is activated only in response to the state values being available for all of the predetermined conditions in the second group of the predetermined conditions.

2. The method according to claim 1, the monitoring of the state values further comprising:
    monitoring at least one of a driving speed of the motor vehicle, a state of an ignition of the motor vehicle, a roadway inclination, an operating state of an accelerator pedal of the motor vehicle, a driver presence, a coupling state of a clutch in a drive train of the motor vehicle, and a switching state of a parking brake switch of the motor vehicle.

3. The method according to claim 1 further comprising:
    checking, as the first group of predetermined conditions, whether (i) a driving speed of the motor vehicle is equal to zero and (ii) an ignition of the motor vehicle is switched off.

4. The method according to claim 1 further comprising:
checking, as the second group of predetermined conditions, whether (i) an ignition of the motor vehicle is switched on and (ii) an accelerator pedal of the motor vehicle is operated.

5. The method according claim 1 further comprising:
deactivating the at least one parking brake depending on a position of an accelerator pedal of the motor vehicle and a current roadway inclination.

6. The method according claim 1 further comprising:
checking whether all of the predetermined conditions in the second group of the predetermined conditions can be checked for compliance and non-compliance only in response to a functionality of a parking brake switch of the motor vehicle not being able to be established.

7. The method according claim 1 further comprising:
checking, in response to a predetermined condition in the second group not being able to be successfully checked, a parking brake switch of the motor vehicle for functionality; and
activating the at least one parking brake in response to the functionality being established even though the predetermined condition in the second group is not able to be successfully checked.

8. The method according claim 1 further comprising:
at least one of (i) outputting a warning message and (ii) suppressing activation of the at least one parking brake, in response to a predetermined condition in the second group not being able to be successfully checked and a functionality of the parking brake switch not being able to be established.

9. An apparatus for automating operation of at least one parking brake of a motor vehicle, apparatus comprising:
a controller configured to activate and deactivate the at least one parking brake in an automated manner, the controller being further configured to:
monitor state values of the motor vehicle;
compare the state values with predetermined conditions;
automatically activate the at least one parking brake in response to a first group of the predetermined conditions being met; and
automatically deactivate the at least one parking brake in response to a second group of the predetermined conditions being met,
wherein the at least one parking brake is activated only in response to the state values being available for all of the predetermined conditions in the second group of the predetermined conditions.

10. A parking brake system for a motor vehicle, the parking brake system comprising:
at least one parking brake; and
an apparatus configured to automate operation of the at least one parking brake, the apparatus having a controller configured to activate and deactivate the at least one parking brake in an automated manner, the controller being further configured to:
monitor state values of the motor vehicle;
compare the state values with predetermined conditions;
automatically activate the at least one parking brake in response to a first group of the predetermined conditions being met; and
automatically deactivate the at least one parking brake in response to a second group of the predetermined conditions being met,
wherein the at least one parking brake is activated only in response to the state values being available for all of the predetermined conditions in the second group of the predetermined conditions.

* * * * *